(12) United States Patent
Zhang

(10) Patent No.: US 10,510,245 B2
(45) Date of Patent: Dec. 17, 2019

(54) APPARATUS SYSTEM AND METHOD FOR CONTROLLING MULTIPLE DEVICES SIMULTANEOUSLY USING SHORT-RANGE WIRELESS COMMUNICATION

(71) Applicant: Shiyong Zhang, Boxborough, MA (US)

(72) Inventor: Shiyong Zhang, Boxborough, MA (US)

(73) Assignee: LEDVANCE LLC, Wilmington, MA (US)

( * ) Notice: Subject to any disclaimer, the term of this patent is extended or adjusted under 35 U.S.C. 154(b) by 0 days.

(21) Appl. No.: 16/531,240

(22) Filed: Aug. 5, 2019

(65) Prior Publication Data

US 2019/0355243 A1  Nov. 21, 2019

Related U.S. Application Data

(63) Continuation of application No. 15/918,361, filed on Mar. 12, 2018, now Pat. No. 10,373,484.

(51) Int. Cl.
| | |
|---|---|
| *G08C 17/02* | (2006.01) |
| *H04L 12/28* | (2006.01) |
| *H04W 76/14* | (2018.01) |
| *H04W 4/80* | (2018.01) |

(52) U.S. Cl.
CPC ............ *G08C 17/02* (2013.01); *H04L 12/282* (2013.01); *H04L 12/2809* (2013.01); *H04W 4/80* (2018.02); *H04W 76/14* (2018.02); *G08C 2201/92* (2013.01); *G08C 2201/93* (2013.01); *H04L 2012/2841* (2013.01)

(58) Field of Classification Search
CPC ............... G08C 17/02; G08C 2201/92; G08C 2201/93; H04W 4/80; H04W 76/14; H04L 12/2809; H04L 12/282; H04L 2012/2841
See application file for complete search history.

(56) References Cited

U.S. PATENT DOCUMENTS

| | | | |
|---|---|---|---|
| 9,451,573 B2 * | 9/2016 | Erickson ............... | H04W 76/10 |
| 9,538,332 B1 * | 1/2017 | Mendelson ............ | H04W 4/90 |
| 9,713,180 B1 * | 7/2017 | Gupta .................... | H04W 4/70 |
| 9,882,988 B1 * | 1/2018 | Yu ......................... | H04W 4/70 |

(Continued)

OTHER PUBLICATIONS

Qualcomm; "An Introduction to CSRMesh"; 2016; pp. 1-31.*

*Primary Examiner* — Brian E Miller

(74) *Attorney, Agent, or Firm* — Hayes Soloway PC

(57) ABSTRACT

A system for controlling multiple appliances concurrently using short-range wireless communication includes a control device. A command advertisement includes at least one encoded command and at least one target identity string within an advertisement. The command advertisement is within the control device. A transmitter integral with the control device transmits the command advertisement. Appliances are remotely located relative to the control device and within a transmission range of the transmitter. Each appliance includes at least one receiver, at least one appliance processor and at least one appliance identity string. Each appliance receives the command advertisement through the receiver. The appliance processor decodes the encoded command. The appliance processor only executes the encoded command if the target identity string matches the appliance identity string. The receiver receives the command advertisement without being paired to the transmitter.

15 Claims, 6 Drawing Sheets

(56) References Cited

U.S. PATENT DOCUMENTS

| | | | |
|---|---|---|---|
| 2011/0210816 A1* | 9/2011 | Wang | H04L 63/0428 340/3.71 |
| 2015/0263886 A1* | 9/2015 | Wang | H04L 41/08 370/254 |
| 2016/0027399 A1* | 1/2016 | Wilde | G06F 13/382 345/520 |
| 2016/0088424 A1* | 3/2016 | Polo | H04W 4/80 455/41.1 |
| 2016/0165387 A1* | 6/2016 | Nhu | H04L 67/10 455/41.1 |
| 2017/0006694 A1* | 1/2017 | Davis | H05B 37/0263 |
| 2017/0041316 A1* | 2/2017 | Setchell | H04L 63/0876 |
| 2017/0048280 A1* | 2/2017 | Logue | H04L 12/2818 |
| 2017/0064045 A1* | 3/2017 | Pai | H04W 4/70 |
| 2017/0094742 A1* | 3/2017 | Nakamura | H05B 33/0815 |
| 2017/0126834 A1* | 5/2017 | Fransen | H04L 67/303 |
| 2017/0150239 A1* | 5/2017 | Davis | G01R 21/133 |
| 2017/0238129 A1* | 8/2017 | Maier | H04W 4/02 455/404.2 |
| 2018/0109999 A1* | 4/2018 | Finnegan | H04L 12/4625 |
| 2018/0139265 A1* | 5/2018 | Shah | H04L 67/04 |
| 2018/0176009 A1* | 6/2018 | Agerstam | H04L 9/0841 |
| 2018/0220353 A1* | 8/2018 | Mendiola | H04B 7/15 |

* cited by examiner

200

Encoding at least one command 106 within at least one advertisement to make a command advertisement 108 using a control processor 104 within a control device 102 (Block 202).

↓

A transmission device 110 integral with the control device 102 transmits the command advertisement 108, wherein the at least one command advertisement 108 contains the at least one encoded command (Block 204).

↓

A plurality of receiving devices 122 receive the at least one command advertisement 108 with or without pairing to the transmission device 110, wherein each of the receiving devices 122 is mounted within one of a plurality of appliances 120 and the plurality of appliances 120 are remotely located from the control device 102 (Block 206).

↓

Each of a plurality of appliance processors 124 decode the at least one encoded command, wherein each of the appliances 120 has one of the appliance processors 124 (Block 208).

FIG. 5

APPARATUS SYSTEM AND METHOD FOR CONTROLLING MULTIPLE DEVICES SIMULTANEOUSLY USING SHORT-RANGE WIRELESS COMMUNICATION

This patent application is a Continuation and claims benefit and priority to U.S. patent application Ser. No. 15/918,361, titled "APPARATUS SYSTEM AND METHOD FOR CONTROLLING MULTIPLE DEVICES SIMULTANEOUSLY USING SHORT-RANGE WIRELESS COMMUNICATION" filed on Mar. 12, 2018, which is herein incorporated by reference in its entirety. The present disclosure generally relates to short-range, wireless communication and, more particularly, is related to controlling many electronic devices contemporaneously with a mobile device using short-range wireless communication.

FIELD

Background

The internet of things (IOT) is the label given to a relatively recent trend of connecting household appliances and devices to the internet to develop greater and more convenient control over the devices. A relatively standard method of controlling the appliances using a mobile device, such as a telephone, is to connect the appliances to a hub, which communicates with a local area network, which can be accessed with the mobile device or a computer. However, controlling the appliance with a first signal from the mobile device to the network, a second signal from the network to the hub, and a third signal from the hub to the appliance means that there are three different communication pathways and deterioration of any of the three can interrupt control of the appliance.

FIG. 1 is a block diagram of a broadcast communication system 10 without a hub that exists in the prior art. The diagram includes a control device 12, such as a smart phone and a plurality of peripheral devices 14, such as lamps or other appliances. Within this communication system 10, a peripheral device 14 that is not paired to a control device 12 transmits a plurality of signals, known as advertisements 16, every minute if not every second in search of a control device 12. Once a control device 12 pairs with the peripheral device 14, the peripheral device 14 stops sending advertisements 16 and waits for commands from the control device 12.

Many appliances are equipped with transceivers that permit short-range wireless communication, such as Bluetooth Low Energy communication. These transceivers can receive communications from devices other than hubs. Specifically, the appliance transceivers can receive communications directly from mobile devices and direct communication would simplify appliance control. However, it can be difficult for a mobile device to communicate contemporaneously with several or many appliances using classical Bluetooth communication as classical Bluetooth communication is designed to be point-to-point. At best, mobile device can pair and send signals sequentially to a number of appliances, although sequential signaling results in delayed communication to appliances at the end of the sequence.

A solution being devised to address the point-to-point limitations of Bluetooth Low Energy communication is identified within the industry as a mesh. The mesh turns appliances into network nodes. For example, for traditional BLE communication to turn off appliance A, appliance B, and appliance C would require the mobile device to connect to appliance A, then turn appliance A off, then disconnect from appliance A, then connect to appliance B, then turn off appliance B, then disconnect from appliance B, then connect to appliance C, then turn off appliance C, then disconnect from appliance C. Conceptually, as illustrated in FIG. 2, the mesh would involve the mobile device connecting to appliance A, turning off appliance A and instructing appliance A to turn off appliance C, then disconnecting with appliance A (step 1), then connect with appliance B while appliance A connects to appliance C, then appliance B and appliance C would be contemporaneously instructed to turn off (step 2). The mesh structure can then continue to grow, where appliances A, B, and C are sending instructions to three more appliances while the mobile device connects with another device, doubling its reach with every step.

Unfortunately, the industry has not been able to agree unanimously on any mesh standards, hampering implementation. Further, memory limitations in current appliance hardware may limit the capacity for appliance to serve as nodes that pass instructions to multiple devices. Thus, a heretofore unaddressed need exists in the industry to address the aforementioned deficiencies and inadequacies.

SUMMARY

In light of the foregoing, the present disclosure generally relates to an apparatus, system and method for controlling multiple devices simultaneously using short-range wireless communication. Generally, the system includes a control device having a control processor capable of encoding at least one command within at least one advertisement to make a command advertisement. A transmission device integral with the control device is capable of transmitting the command advertisement. The at least one command advertisement contains the at least one encoded command. A plurality of appliances is remotely located relative to the control device. There is a plurality of receiving devices, wherein each of the appliances has at least one of the receiving devices. The appliances are each capable of receiving the at least one command advertisement through the receiving devices. Finally, there is a plurality of appliance processors, wherein each of the appliances has at least one of the appliance processors. Each of the appliance processors is capable of decoding the at least one encoded command. Further, each of the receiving devices receive the at least one command advertisement with or without being paired to the transmission device.

Generally, the method for controlling multiple devices simultaneously using short-range wireless communication contains the step of: encoding at least one command within at least one advertisement to make a command advertisement using a control processor within a control device; transmitting the command advertisement with a transmission device integral with the control device, wherein the at least one command advertisement contains the at least one encoded command; receiving the at least one command advertisement through a plurality of receiving devices, wherein each of the receiving devices is mounted within one of a plurality of appliances and the plurality of appliances are remotely located from the control device; and decoding the at least one encoded command with each of a plurality of appliance processors, wherein each of the appliances has at least one of the appliance processors, wherein each of the receiving devices receive the at least one command advertisement with or without being paired to the transmission device.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

The present disclosure can be better understood with reference to the following drawings. The components of the drawing are not necessarily to scale, emphasis instead being placed upon clearly illustrating the principles of the present disclosure. Moreover, in the drawings, like referenced numbers designate corresponding parts throughout the several views.

FIG. 5 is a flow chart illustrating a method for controlling multiple appliances concurrently using short-range wireless communication, in accordance with the first exemplary embodiment of the present disclosure.

DETAILED DESCRIPTION

The present disclosure generally relates to a communication system and, more particularly, is related to a short-range wireless communication system. It should be noted that, while the following provides a series of examples of the communication system, its components and operation, other configurations may be utilized without departing from the scope of the claims.

Figure 1:
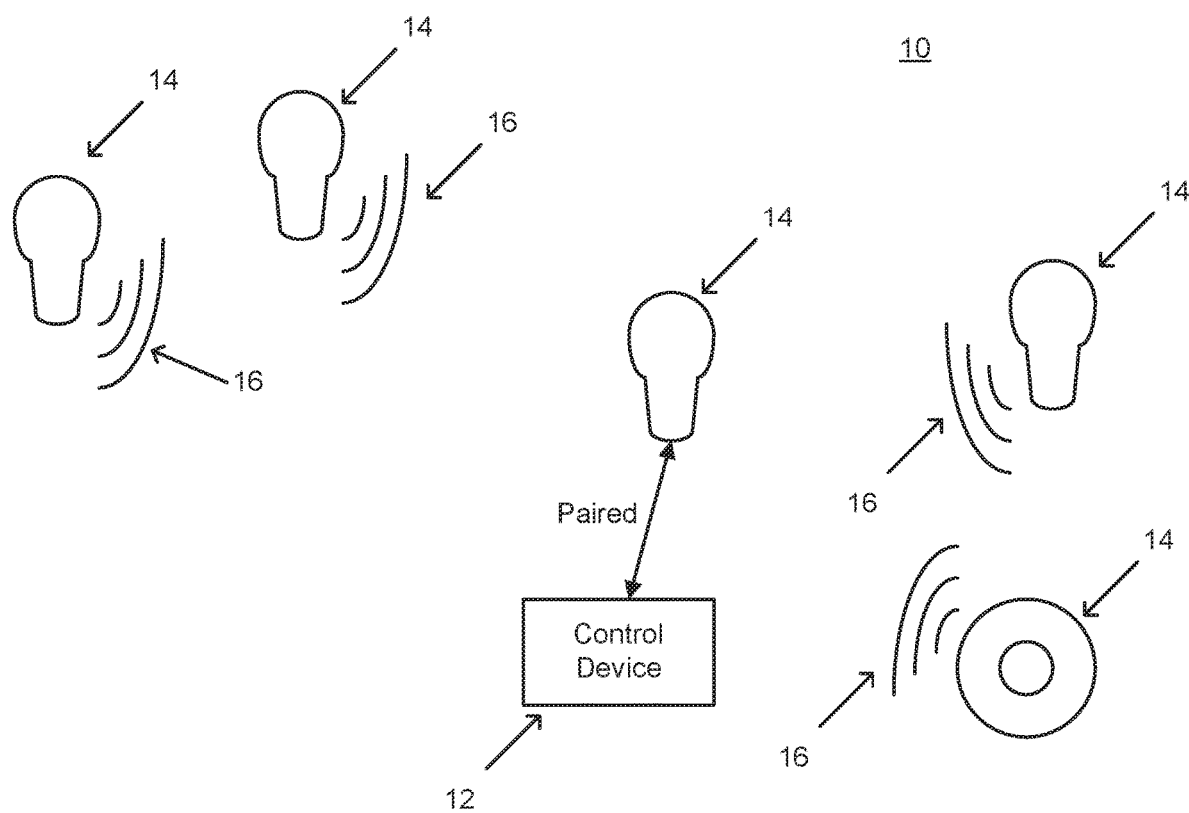
FIG. 1 is a block diagram of a broadcast communication system 10 without a hub that exists in the prior art.
Figure 2:
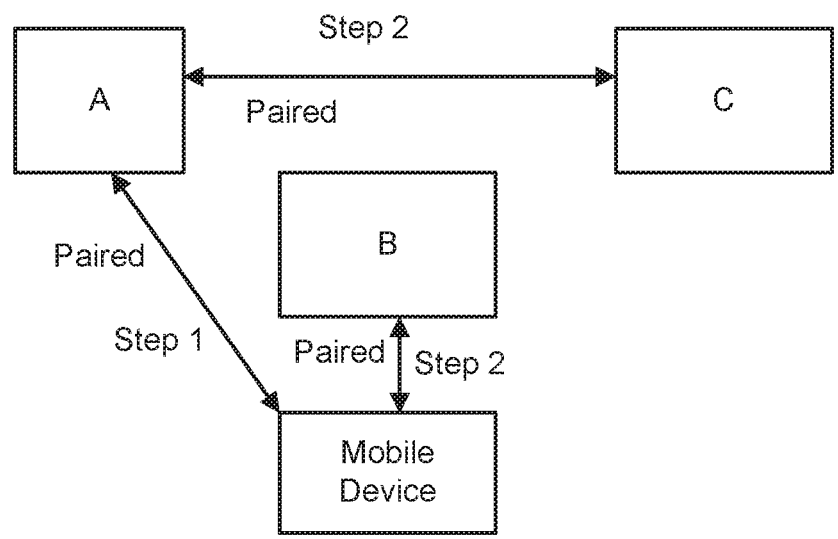
FIG. 2 is a block diagram of a Bluetooth Low Energy communication system 10 concept that is known in the prior art.
Figure 3:
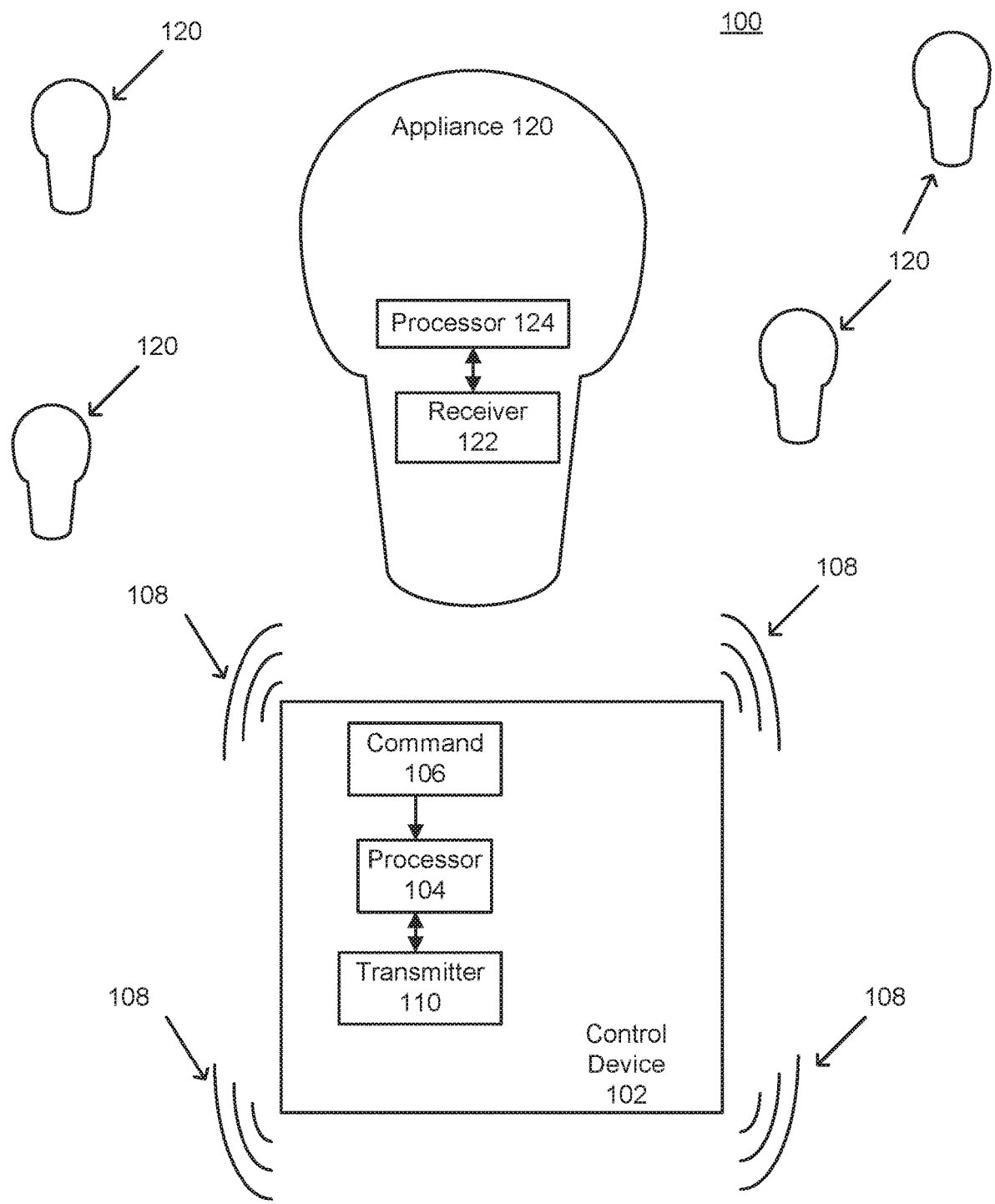
FIG. 3 is a block diagram of a short-range wireless communication system, in accordance with a first exemplary embodiment of the present disclosure.

FIG. 3 is a block diagram of a short-range wireless communication system 100, in accordance with a first exemplary embodiment of the present disclosure. Generally, the system 100 includes a control device 102 having a control processor 104 capable of encoding at least one command 106 within at least one advertisement to make a command advertisement 108. A transmission device 110 integral with the control device 102 is capable of transmitting the command advertisement 108. The at least one command advertisement 108 contains the at least one encoded command 106. A plurality of appliances 120 is remotely located relative to the control device 102. There is a plurality of receiving devices 122, wherein each of the appliances 120 has at least one of the receiving devices 122. The appliances 120 are each capable of receiving the at least one command advertisement 108 through the receiving devices 122. Finally, there is a plurality of appliance processors 124, wherein each of the appliances 120 has at least one of the appliance processors 124. Each of the appliance processors 124 is capable of decoding the at least one encoded command 106. Further, each of the receiving devices 122 receive the at least one command advertisement 108 with or without being paired to the transmission device 110.

The control device 102 may be a mobile phone, a mobile device, a hub, or any other device capable of communicating wirelessly with the appliances 120 in a manner defined and described herein. The control device 102 may be a device dedicated to appliance control and accessible through a wireless local area network. It is contemplated that the control device 102 and, more specifically, the transmission device 110 will communicate through a short-range frequency band such as the band associated with Bluetooth communication, although other communication frequencies may be similarly capable of completing the communication contemplated herein and are considered to be within the scope of the present disclosure.

As disclosed, the system 100 overcomes the existing problem of needing to pair a control device 102 with an appliance 120 to issue commands 106 and the limitations on the number of appliances 120 with which a control device 102 can be paired by allowing a control device 102 to broadcast a control signal to a plurality of appliances 120 with or without pairing. The system 100 achieves this solution by altering the traditional relationship of control device 102 and appliance 120. Whereas prior art appliances would transmit advertisements in search of a control device and control devices would scan for advertisements, the system 100 disclosed herein has the appliances 120 scanning for advertisements and the control devices 102 encoding commands 106 with advertisements.

The control device 102 has the control processor 104 capable of encoding at least one command 106 within at least one advertisement to make the command advertisement 108. The control processor 104 does not need to be more complicated than processors known in the art for use with short-range communication. The command 106 could be as simple as an on or off command to turn the appliance 120 on or off or as complicated as the functionality of the appliance will permit.

The command advertisement 108 is a signal broadcast a short-range, as may be known in the art. Unlike a communication with a paired device, the command advertisement 108 is a one-directional communication that can be received by any and all receiving devices 122 within range. Prior art advertisements are from appliances broadcasting for a control device for pairing, indicating the availability of the appliance. The command advertisement 108 is one of the novel features of the present disclosure.

The transmission device 110 integral with the control device 102 is capable of transmitting the command advertisement 108. The transmission device 110 does not need to deviate from transmission devices known for transmitting Bluetooth signals to satisfy the requirements of the present disclosure, but other transmission devices capable of short-range communication are contemplated.

The at least one command advertisement 108 contains the at least one encoded command 106. It is noted that 'encoded' is broader than 'encrypted'. Encoding may simply imply associating the command 106 with the identity of one or more target appliances 120 before the command advertisement 108 is broadcast. For example, if the appliances 120 within range include a lamp and a thermostat, an "off" command 106 to turn off the lamp would need to be encoded to avoid turning off the thermostat. Encoded advertisements are unique to the present disclosure.

The plurality of appliances 120 is remotely located relative to the control device 102. More specifically, the appliances 120 are not integral with the control device 102 or wired to the control device 102. Hard-wired systems would not benefit from this solution.

Each of the appliances 120 has at least one of the receiving devices 122. The appliances 120 are each capable of receiving the at least one command advertisement 108 through the receiving devices 122. The receiving device 122 does not need to deviate from receiving devices known for receiving Bluetooth signals to satisfy the requirements of the present disclosure, but other receiving devices capable of short-range communication are contemplated.

Finally, there is a plurality of appliance processors 124, wherein each of the appliances 120 has at least one of the appliance processors 124. Appliances 120 may include, but are not limited to, lamps, refrigerators, thermostats, and motion sensors. A value of the present disclosure is the ability to concurrently issue commands to a group of appliances 120, and so may lend itself more to lamps or other higher volume appliances 120. Each of the appliance processors 124 is capable of decoding the at least one encoded command 106. The appliance processors 124 do not need to be more complicated than processors currently found in devices known in the industry for IOT (Internet of Things) purposes, although more complex processors are contemplated and within the scope of the present disclosure.

Further, each of the receiving devices 122 receive the at least one command advertisement 108 with or without being paired to the transmission device 110. Scanning to receive an advertisement is an operation known to those of ordinary skill in the art of short-range communication systems.

Figure 4:
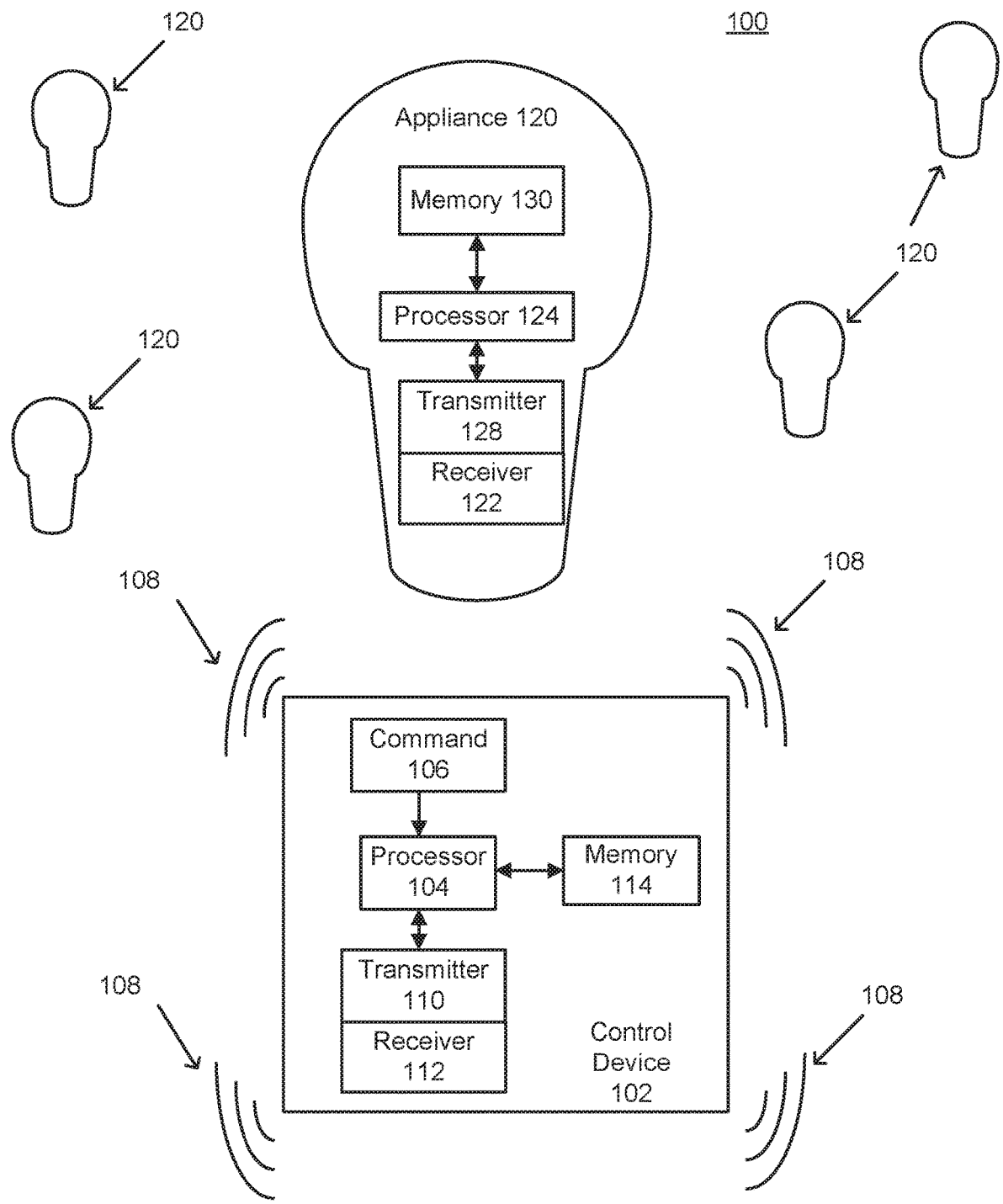
FIG. 4 is a block diagram of the short-range wireless communication system of FIG. 3 with additional contemplated elements, in accordance with a first exemplary embodiment of the present disclosure.

FIG. 4 is a block diagram of the short-range wireless communication system of FIG. 3 with additional contemplated elements, in accordance with a first exemplary embodiment of the present disclosure. Generally, the system 100 includes a control device 102 having a control processor 104 capable of encoding at least one command 106 within at least one advertisement to make a command advertisement 108. A transmission device 110 integral with the control device 102 is capable of transmitting the command advertisement 108. The at least one command advertisement 108 contains the at least one encoded command 106. The control device 102 further includes a control receiver 112 and a control non-evaporative memory device 114.

A plurality of appliances 120 is remotely located relative to the control device 102. There is a plurality of receiving devices 122, wherein each of the appliances 120 has at least one of the receiving devices 122. The appliances 120 are each capable of receiving the at least one command advertisement 108 through the receiving devices 122. Finally, there is a plurality of appliance processors 124, wherein each of the appliances 120 has at least one of the appliance processors 124. Each of the appliance processors 124 is capable of decoding the at least one encoded command 106. Further, each of the receiving devices 122 receive the at least one command advertisement 108 with or without being paired to the transmission device 110. The appliances 120 each also include an appliance transmitter 128 and an appliance non-evaporative memory device 130.

The control device 102 may be used to initialize the appliances 120 for the disclosed communication system 100. The appliances 120 may be programmed to scan for advertisements as a default position prior to initializing the appliances 120 for the present disclosure. The control device 102 may scan for each of the appliances 120 and sequentially pair with the appliances 120. Pairing requires both the control device 102 and the appliances 120 have the ability to both transmit and receive signals. The control transmitter 110 and receiver 112 may be an integral device or distinguishable elements within the control device 102. The appliance transmitter 128 and receiver 122 may be an integral device or distinguishable elements within the appliance 120. Once paired with one of the appliances 120, the control device 102 may identify an existing identity string stored in the appliance non-evaporative memory 130 or the control device 102 may store an identity string in the appliance non-evaporative memory 130. The control device 102 may also store the identity string of the appliance 120 in the control non-evaporative memory 114. The control device 102 may also instruct the appliance 120 to alter its operation from transmitting advertisements to scanning for advertisements. The control device 102 may continue this initiation procedure sequentially with some or all of the appliances 120 within broadcast range.

After unpairing from the control device 102, the appliances 120 can be controlled with a control advertisement 108. And the control device 102 is able to encode commands 106 with the identity string of one or more appliances 120 before broadcasting command advertisements 108. The command advertisements 108 can be encoded to transmit a control advertisement 108 to one, more than one and less than all, or all of the appliances 120. Specifically, all appliances 120 within broadcast range of the control device 102 will receive the control advertisement 108. All appliances 120 will decode the control advertisement 108 and compare the identity string encoded within the control advertisement 108 with the identity string stored in the appliance non-evaporative memory 130. Only those appliances 120 receiving a command 106 encoded with their identity string will execute the command 106.

The control device 102 may issue a plurality of identical control advertisements 108. Multiple control advertisements 108 may be issued periodically within one second and/or within one minute. Issuing multiple control advertisements 108 may increase the likelihood that all or most of the appliances 120 within broadcast range detect and receive the control advertisement 108. After issuing the control advertisements 108, the control device 102 may pair with one or more of the appliances 120. The control device 102 may confirm that each of the appliances 120 acted as instructed and, if any appliances 120 failed to act as instructed, may instruct the appliance 120 again while paired in a manner traditionally used for Bluetooth communication.

FIG. 5 is a flow chart 200 illustrating a method for controlling multiple appliances 120 concurrently using short-range wireless communication, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As shown in block 202, the method includes encoding at least one command 106 within at least one advertisement to make a command advertisement 108 using a control processor 104 within a control device 102. A transmission device 110 integral with the control device 102 transmits the command advertisement 108, wherein the at least one command advertisement 108 contains the at least one encoded command (block 204). A plurality of receiving devices 122 receive the at least one command advertisement 108 with or without pairing to the transmission device 110, wherein each of the receiving devices 122 is mounted within one of a plurality of appliances 120 and the plurality of appliances 120 are remotely located from the control device 102 (block 206). Each of a plurality of appliance processors 124 decode the at least one encoded command, wherein each of the appliances 120 has at least one of the appliance processors 124 (block 208).

The appliances 120 may need to be initialized to behave in a manner compatible with the disclosed system. First, the control device 102 is paired with each of the appliances 120. While paired, each of the appliances 120 is programmed for control by the control device 102. The control device 102 then unpairs from each of the appliances 120. Programming the appliances 120 may involve programming each of the appliance processors 124 to scan for control advertisements 108.

Initializing the appliances 120 may also include the control device 102 storing in each of a plurality of appliance non-evaporative memory devices 130 an individual identifier, wherein each of the appliances 120 contains at least one of the appliance non-evaporative memory devices 130. Initializing may also involve programming of the control device 102. Programming the control device 102 may include storing the individual identifier for each of the appliances 120 in a control non-evaporative memory device 114 located in the control device 102 and storing control options for each of the appliances 120 in the control non-evaporative memory device 114. The control options for each of the appliances 120 may already be stored in the appliance non-evaporative memory 130 prior to any initializing steps. Control options for lamps may include on/off control, dimming, and color variation, among other options.

The method may also include a status check to confirm the appliances 120 performed as instructed. The status check may include pairing the control device with each of the appliances 120 non-simultaneously. A status identifier is transmitted from each of the appliances 120 to the control device 102 identifying the status of the appliance 120. The control device 102 may confirm the status of the appliance 120 reflects performance of one or more relevant commands. If the appliance 120 does not reflect the commanded status, the control device 102 may modify the status of the appliance 120 in a manner known in the art for paired devices. The control device then unpairs from each of the appliances.

Figure 6:
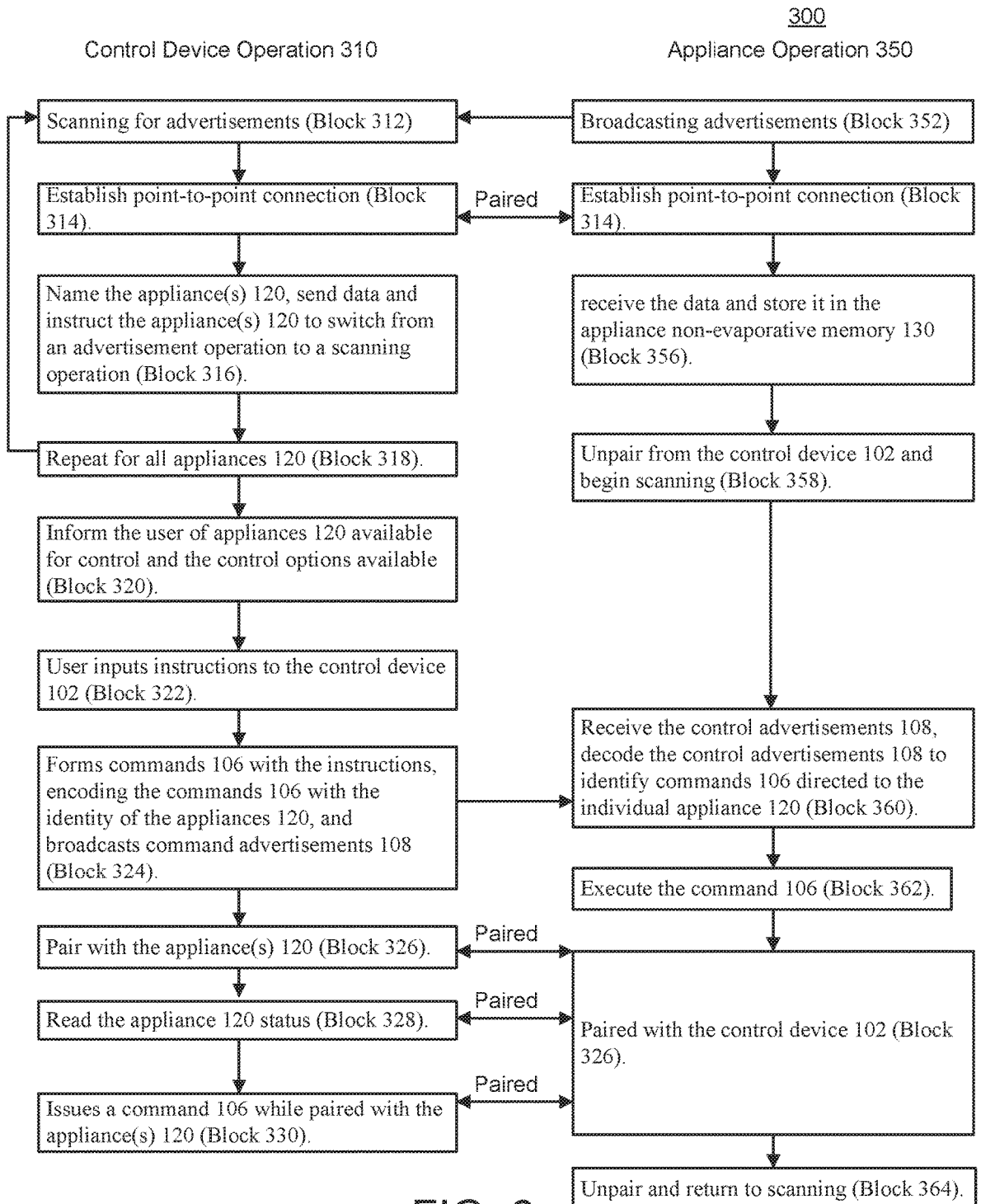
FIG. 6 is a more detailed flow chart illustrating a method for controlling multiple appliances concurrently using short-range wireless communication, in accordance with the first exemplary embodiment of the present disclosure.

FIG. 6 is a more detailed flow chart 300 illustrating a method for controlling multiple appliances 120 concurrently using short-range wireless communication, in accordance with a narrower interpretation of the first exemplary embodiment of the present disclosure. The flow chart illustrates the operation (column 310) of the control device 102 and the operation (column 350) of the appliance(s) 120. Arrows within the column illustrate operational flow while arrows within the space between the columns representing the direction(s) of signal transmission. As associated with traditional Bluetooth communication devices, operations begin with the control device 102 scanning for advertisements (block 312) and the appliance(s) 120 broadcasting advertisements (block 352). The control device 102 and the appliance(s) 120 establish point-to-point connection (block 314). The control device 102 may name the appliance(s) 120, send a group number, and/or a controller ID and instruct the appliance(s) to switch from an advertisement operation (block 352) to a scanning operation (block 316). The appliance(s) 120 receive the data from the control device 102 and store it in the appliance non-evaporative memory 130 (block 356). The appliance(s) 120 unpair from the control device 102 and begin scanning (block 358). The control device 102 then returns to scanning for other appliance(s) 120 still advertising and repeats the aforementioned steps (block 318).

Once all of the appliances 120 within the broadcast range of the control device 102 have been identified and set to scan (block 316), the control device 102 is prepared to issue control advertisements 108 to the appliance(s) 120. The control device 102 may include a display or other output system to inform the user of appliances 120 available for control and the control options available for the appliances 120 (block 320). The user identifies appliances 120 to manipulate and inputs instructions to the control device 102 (block 322). The control device 102 forms commands 106 with the instructions, encoding the commands 106 with the identity of the appliances 120, and broadcasts command advertisements 108 (block 324). The appliances 120 individually receive the control advertisements 108, decode the control advertisements 108 to identify commands 106 directed to the individual appliance 120 (block 360). The appliances 120 execute the commands 106 (block 362).

Optionally, it may be beneficial to perform status checks to confirm the appliances 120 are operating as commanded. The control device 102 may again pair with the appliance(s) 120 (block 326). The control device 102 reads the status of the appliance(s) 120 (block 328). If the status of the appliance(s) 120 differs from the command 106 control device for the specific appliance(s) 120, the control device 102 issues a command 106 while paired with the appliance(s) 120 (block 330). The appliance(s) 120 unpair and return to scanning (block 364).

It should be emphasized that the above described embodiments of the present disclosure are merely some possible examples of implementations, set forth for a clear understanding of the principles of the disclosure. Many variations and modifications may be made to the above described embodiments of the disclosure without departing substantially from the spirit and principles of the disclosure. All such modifications and variations are intended to be included herein within the scope of this disclosure and the present disclosure, and protected by the following claims.

What is claimed is:

1. A system for controlling multiple appliances concurrently using short-range wireless communication, the system comprising:
   a control device;
   a command advertisement comprising at least one encoded command and at least one target identity string within an advertisement, wherein the command advertisement is within the control device;
   a transmitter integral with the control device capable of transmitting the command advertisement;
   a plurality of appliances remotely located relative to the control device and within a transmission range of the transmitter, wherein each of the appliances from the plurality of appliances comprises:
      at least one receiver, whereby each of the appliances from the plurality of appliances receives the at least one command advertisement through the at least one receiver;
      at least one appliance processor, whereby the at least one appliance processor decodes the at least one encoded command; and an appliance identity string, whereby the at least one appliance processor only executes the encoded command if the target identity string matches the appliance identity string, wherein the at least one receives the at least one command advertisement without being paired to the transmitter.

2. The system of claim 1, wherein each of the appliances from the plurality of appliances further comprises an appliance transmitter and the control device further comprises a control receiver.

3. The system of claim 1, wherein each of the appliances from the plurality of appliances further comprises an appliance non-evaporative memory device and the control device further comprises a control non-evaporative memory device.

4. The system of claim 1, wherein the control device has the capacity to be paired with each of the appliances from the plurality of appliances, and wherein the control device does not have the capacity to be paired with the plurality of appliances simultaneously.

5. The system of claim 1, wherein the command advertisement contains at least one instruction for the plurality of appliances.

6. The system of claim 1, wherein the command advertisement contains at least one instruction for less than the plurality of appliances.

7. A method for controlling multiple appliances concurrently using short-range wireless communication, the method comprising the steps of:
   encoding at least one command with at least one target identity string within at least one advertisement to make a command advertisement using a control processor within a control device;
   transmitting the command advertisement with a transmitter integral with the control device;
   receiving the at least one command advertisement through a plurality of receivers, wherein each of the receivers from the plurality of receivers is mounted within a plurality of appliances and the plurality of appliances are remotely located from the control device within a range of the transmitter;
   decoding the at least one encoded command with each of a plurality of appliance processors, wherein each of the appliances from the plurality of appliances has at least one of the plurality of appliance processors; and
   executing the command at each of the appliances from the plurality of appliances in which the target identity string matches an appliance identity string stored in a memory of the appliance;
   wherein each of the receivers from the plurality of receivers receives the at least one command advertisement unpaired from the transmitter.

8. The method of claim 7, wherein the method further comprises the steps of:
   pairing the control device with each of the appliances from the plurality of appliances;
   initializing each of the appliances from the plurality of appliances for control by the control device; and
   unpairing the control device from each of the appliances from the plurality of appliances.

9. The method of claim 8, wherein the step of initializing further comprises programming each of the appliance processors from the plurality of appliances to scan for advertisements.

10. The method of claim 8, wherein each of the appliances contains at least one of appliance non-evaporative memory device and wherein the step of initializing further comprises storing the appliance identity string in each of the plurality of appliance non-evaporative memory devices.

11. The method of claim 10, wherein the method further comprises the steps of:
    storing the appliance identity strings for each of the appliances from the plurality of appliances in a control non-evaporative memory device located in the control device; and
    storing control options for each of the appliances from the plurality of appliances in the control non-evaporative memory device.

12. The method of claim 7, wherein the method further comprises the steps of:
    pairing the control device with each of the appliances from the plurality of appliances;
    transmitting a status identifier from each of the appliances from the plurality of appliances to the control device identifying the status of the appliance; and
    unpairing the control device from each of the appliances from the plurality of appliances.

13. The method of claim 10, wherein the method further comprises the steps of:
    comparing the status identifier to the at least one command in the command advertisement;
    determining the status identifier does not match the at least one command in the command advertisement; and
    transmitting the command to at least one of the appliances from the plurality of appliances while paired to correct the status of the appliance.

14. The method of claim 7, encoding only one command with a plurality of the target identity strings into only one advertisement to make the command advertisement, thereby issuing the command to multiple appliances selected from the plurality of appliances.

15. The method of claim 7, further comprising retransmitting the command advertisement with an appliance transmitter located within one of the appliances from the plurality of appliances.

* * * * *